Dec. 1, 1925.
E. H. JACOBS
1,563,859
POLYPHASE BUS BAR
Filed March 31, 1921  3 Sheets-Sheet 1
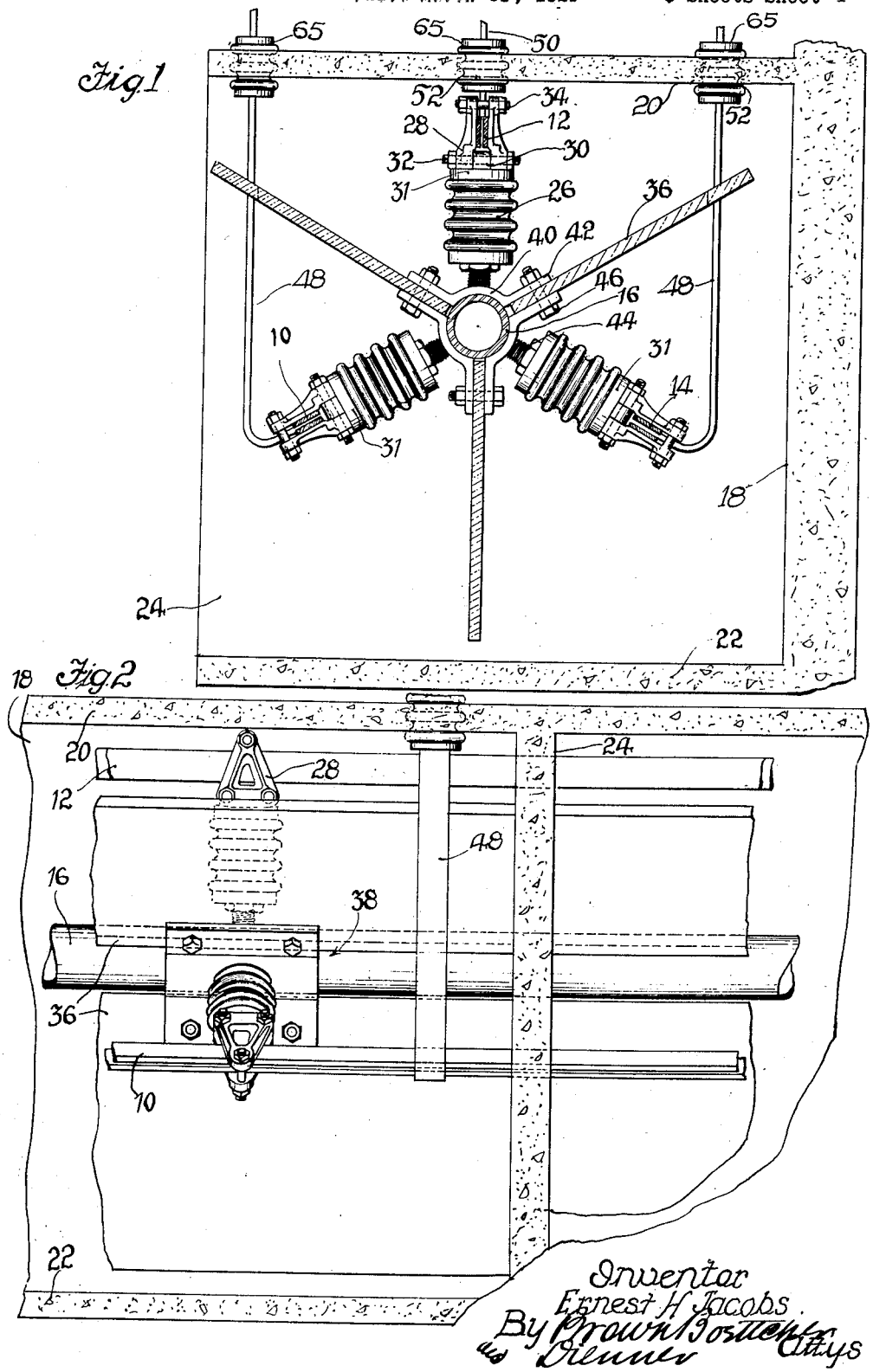
Inventor
Ernest H Jacobs
By Brown Boettcher
 Dienner Attys

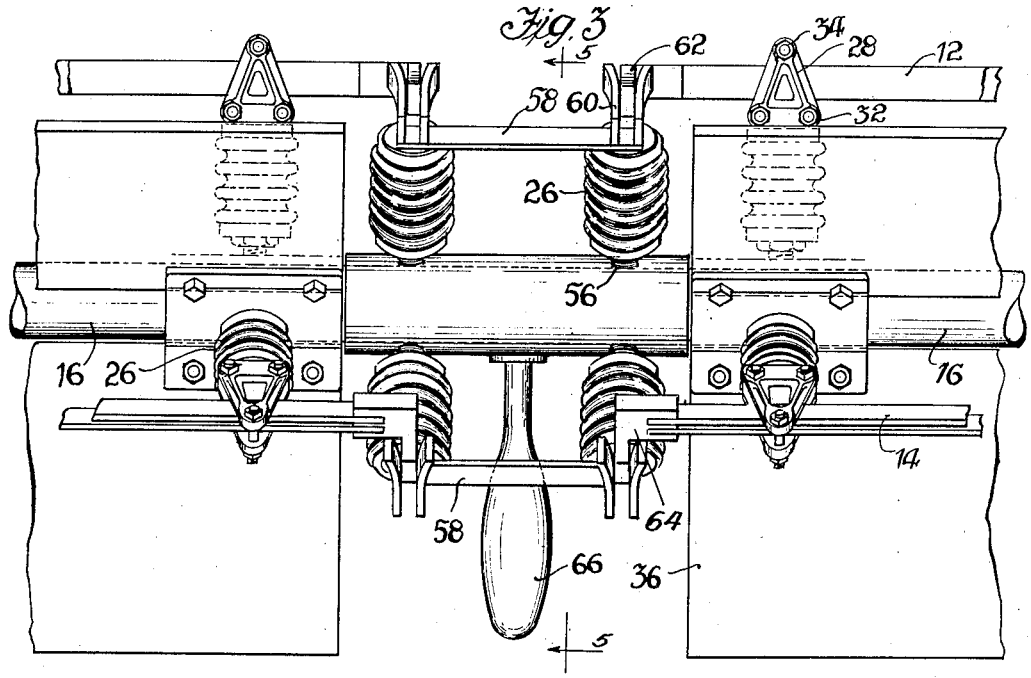
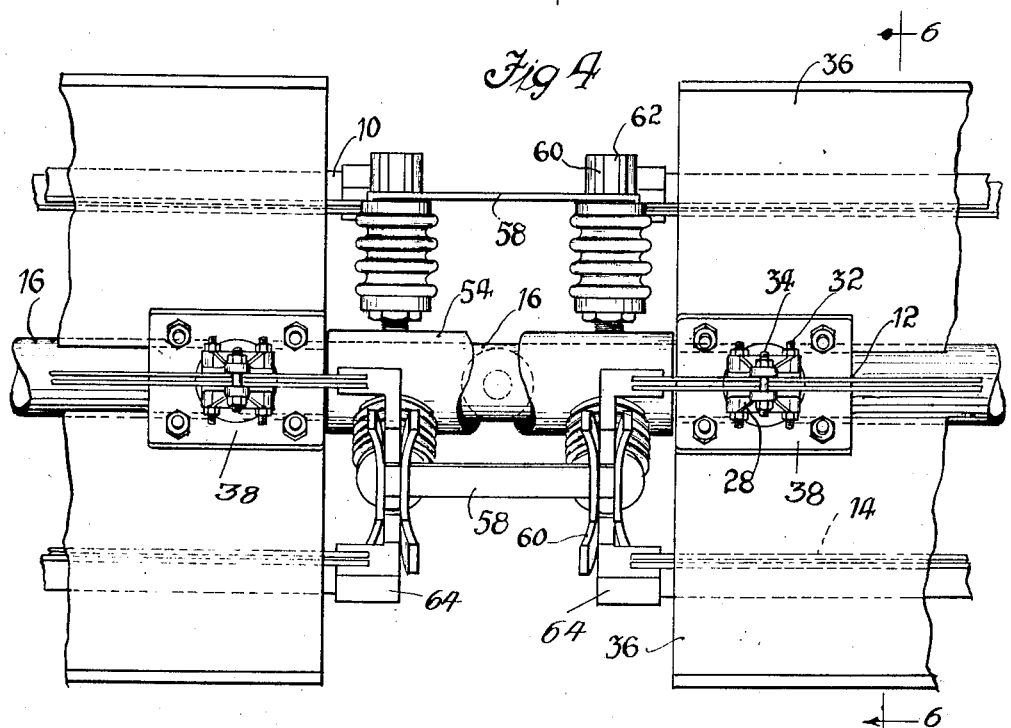

Dec. 1, 1925.

E. H. JACOBS

POLYPHASE BUS BAR

Filed March 31, 1921  3 Sheets-Sheet 3

Inventor
Ernest H Jacobs
By Brown Boucher Attys

Patented Dec. 1, 1925.

1,563,859

UNITED STATES PATENT OFFICE.

ERNEST H. JACOBS, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

POLYPHASE BUS BAR.

Application filed March 31, 1921. Serial No. 457,403.

*To all whom it may concern:*

Be it known that I, ERNEST H. JACOBS, a citizen of the United States, residing at Chicago, in the county of Cook and State of Illinois, have invented a certain new and useful Improvement in Polyphase Bus Bars, of which the following is a full, clear, concise, and exact description, reference being had to the accompanying drawings, forming a part of this specification.

My invention relates to equipment for the distribution of power, particularly in the form of polyphase electric current, and more specifically to an improved arrangement of bus bars, and means for supporting the same and connecting them to other bus bars, or to leads, for the delivery of power.

One object of my invention is to provide a mounting for bus bars such that the mechanical stresses caused by the flow of large currents through the bus bars will be symmetrically balanced or distributed throughout the structure. An important advantage of the construction employed for this purpose is that the electrical reactance and impedance of the circuit is also balanced.

Another object is to provide simple and efficient means for connecting sets of bus bars constructed according to my invention together so as to constitute, in effect, a single set.

Further objects and advantages of my invention will become apparent as the description proceeds.

In the accompanying drawings

Figure 1 is a transverse section; and,

Figure 2 is a side elevation of a set of three-phase bus bars arranged according to my invention.

Figure 3 is a plan view; and,

Figure 4 a rear elevation of two sets of bus bars similar to those shown in Figure 1, and my improved means for connecting the two sets together.

Figure 5:
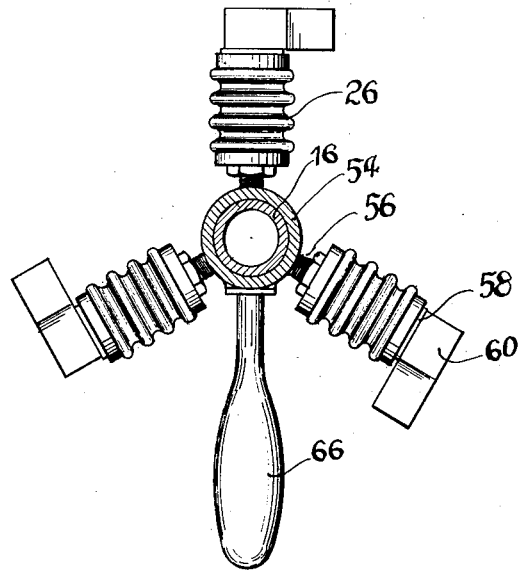
Figure 6:
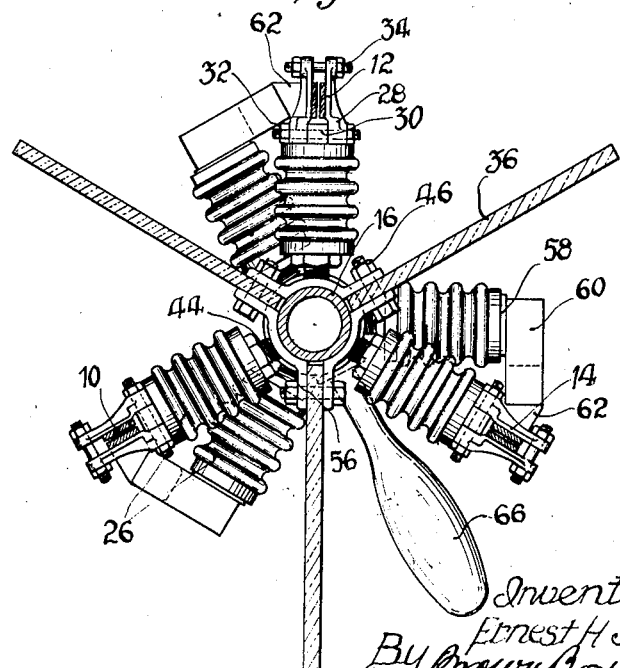

Figure 5 is a section on line 5—5 of Figure 3 of my improved switch, the bus bars being omitted; and, Figure 6 is a section on line 6—6 of Figure 4.

According to my invention, the bus bars corresponding to the number of phases in the system are arranged parallel to a central axis, from which they are uniformly spaced circumferentially, as well as radially. Referring to Figure 1, in which a three-phase system has been illustrated, the bus bars 10, 12 and 14 are spaced 120° apart around the axis of a central supporting pipe or tube 16. Any suitable means may be employed for supporting the pipe 16. I have illustrated the structure arranged parallel to a concrete wall 18, from which wall concrete shelves 20 and 22 project, forming a compartment closed on three sides to receive the bus bars and the supporting means therefor. Partitions 24 extend forward from the wall 18 at intervals to brace the shelves 20 and 22, and divide the space between them into a series of box-like compartments. The pipe 16 may be supported by these partitions where it passes through them, and the partitions are also cut away to provide clearance for the passage of the bus bars themselves.

The enclosing partitions are preferably omitted, since the pipe 16 may be mounted upon insulators and supported in the open air.

Each bus bar is suitably supported at intervals by supports comprising insulators 26, and clamping means at the outer ends of the insulator for engaging the bus bars. I have illustrated duplicate supporting and clamping elements 28, lying on opposite sides of the bus bar where it passes by the ends of the insulators, the lower portion of the clamping elements abutting against opposite faces of lugs 30 projecting from fittings 31 on the outer ends of the insulators. Suitable bolts 32 pass through both opposed clamping members 28 and the lugs 30 to clamp members 28 in position against the lugs. Additional bolts 34 extending between the outer ends of the clamping members complete the mounting, and operate to firmly hold the bus bars in place.

I prefer to employ barriers 36 of transite, fibre, slate, or other suitable insulating material, to increase the effective air gap between adjacent bus bars, and thereby decrease the size of an installation, for carrying a given voltage.

I have provided a simple and compact unitary support for supporting all the insulators and barriers and clamping them in place with respect to the tube 16. Referring to Figure 1, three fittings 38 are provided, each comprising an arcuate portion 40, and straight flanges 42, extending in both directions from the arcuate portions. A pin 44 extends radially outward from the center of the arcuate portion 40, upon which pin the insulator 26 may be mounted in any suitable or preferred manner. The barriers 36 are interposed between adjacent lateral wings 42 of adjacent fittings 38, and the fittings and barriers are clamped together by means of suitable bolts 46. The installation illustrated in Figure 1 is for a three-phase system, and, therefore, only three fittings 38 are employed, but it will be obvious that the principles involved may be readily applied to single phase or polyphase circuits, or it may be applied to a plurality of parallel circuits.

Power may be delivered to or from the bus bars by a very simple arrangement of taps or leads shown in Figure 1. From the lower bus bars 10 and 14 leads 48 extend upwardly, and pass through insulators 65 in the shelf 20 approximately equally spaced from the central lead 50 connected to bus bars 12. Suitable apertures 52 in the shelf 20 receive the insulators 65, and permit free passage of the leads 50 and 48.

In Figures 3 and 4, I have illustrated two aligned sets of bus bars similar to those shown in Figure 1, and an improved switch for simultaneously connecting or disconnecting one set from the other set. A sleeve 54 is rotatably supported on the pipe 16, and suitably restrained against longitudinal movement thereon, preferably by locating two sets of supports 38 adjacent its opposite ends. Suitable collars on the pipe 16 may be employed instead. Sleeve 54 carries insulators 26, preferably mounted on pins 56 threaded directly into the sleeve 54. The insulators on the sleeve support three short bus bar sections 58, carrying at their opposite ends suitable knife switch elements for making contact with co-operating elements on the bus bars. I have illustrated spaced spring blades 60 at the ends of section 58, and studs or contacts 62 forming the terminals of the bus bars, and projecting from blocks 64 suitably mounted on the ends of the bus bars. A handle 66 is carried by the sleeve for operating the switch, and preferably extends directly downward, as shown in Figure 5, when the switch is in closed position. To open the switch, the handle may be drawn forward, as shown in Figure 6, in which figure the switch is illustrated about half open.

Without further elaboration, the foregoing will so fully explain the gist of my invention that others may, by applying current knowledge, readily adapt the same for use under various conditions of service, without departing from certain features of my invention constituting the essential forms of novelty involved, which items are intended to be defined and secured to me by the following claims.

I claim:

1. In an electrical distributing system, main conductors extending parallel to a common axis and circumferentially equally spaced about the same, and a central supporting member carrying no current.

2. The combination recited in claim 1, in combination with a plurality of barriers equal in number to the number of conductors and radiating from the common axis approximately midway between conductors.

3. In a polyphase power installation, conductors corresponding in number to the number of phases and circumferentially spaced about a common axis by substantially equal intervals, barriers extending radially from the common axis approximately midway between the conductors, and leads extending in a plane substantially perpendicular to the common axis away from the conductors in approximately parallelism.

4. In a multiphase power installation, a set of conductors corresponding in number to the number of phases and extending substantially in parallelism, a second set of conductors similar to the first set, said sets of conductors having opposite ends substantially in alignment, and means rotatable about an axis parallel to both said sets of conductors for connecting and disconnecting corresponding conductors in the two sets.

5. In a multiphase power installation, conductors corresponding in number to the number of phases and extending parallel to a common axis, another set of conductors in parallelism with the same axis, and means rotatable about said axis to connect and disconnect the opposing ends of corresponding conductors in the two sets.

6. In a multiphase power installation, conductors corresponding in number to the number of phases and extending in parallelism with a common axis, contact terminals mounted on the ends of said conductors and extending in a plane perpendicular to said common axis, and means rotatable about said axis for establishing or interrupting connection with said contact members.

7. In a multiphase power installation, an elongated fixed main support, a plurality of sets of supporting elements radiating from said main support at suitable intervals along its length, and corresponding in number to the number of phases in the system, bus bars mounted on said set of supports, and barriers extending radially from said main support outward between said bus bars.

8. In a multiphase power installation, a set of conductors extending in parallelism, a second set of conductors also parallel to each other, and means rotatable about an axis parallel to said first and second sets of conductors for connecting and disconnecting the two sets.

9. In a multiphase power installation, conductors equal in number to the number of phases, a central support, and mountings radiating outwardly from said support, to support said conductors thereon.

10. In a multiphase power installation, conductors equal in number to the number of phases, and a central support parallel to said conductors, the conductors being symmetrically arranged about said central support, whereby the structural stresses resulting from the forces due to the current flowing in the different conductors are balanced about the support.

11. In an electrical system, parallel conductors lying at the corners of a polygon, insulating barriers lying between adjacent conductors and a central support for said conductors and said barriers.

12. In an electrical system, parallel conductors lying at the corners of a polygon, and a common support extending centrally between and substantially parallel to said conductors, each pair of adjacent conductors carrying one phase of a polyphase current.

13. In an electrical system, parallel conductors, a support carrying no current parallel to said conductors, and individual mountings extending from said support to each conductor.

14. In a multiphase power installation, relatively fixed line conductors equal in number to the number of phases, a support, and mountings radiating outwardly from said support, to support said conductors thereon.

In witness whereof, I hereunto subscribe my name, this 28th day of March, A. D., 1921.

ERNEST H. JACOBS.